United States Patent [19]

Stöger

[11] Patent Number: 5,408,378
[45] Date of Patent: Apr. 18, 1995

[54] MAGNETIC-TAPE CASSETTE COMPRISING A PRESSURE-MEMBER SUPPORT, AND PRESSURE-MEMBER SUPPORT FOR SUCH A CASSETTE

[75] Inventor: Anton Stöger, Vienna, Austria

[73] Assignee: U.S. Philips Corporation, New York, N.Y.

[21] Appl. No.: 44,142

[22] Filed: Apr. 8, 1993

[30] Foreign Application Priority Data

Oct. 27, 1992 [AT] Austria ................................. 2122/92

[51] Int. Cl.⁶ .............................................. G11B 15/60
[52] U.S. Cl. ................................. 360/132; 360/130.33
[58] Field of Search .............. 360/132, 130.21, 130.32, 360/130.33; 242/199, 341, 346.1

[56] References Cited

U.S. PATENT DOCUMENTS

| | | | |
|---|---|---|---|
| 4,314,299 | 2/1982 | Ishida et al. | 360/132 |
| 4,669,018 | 5/1987 | Oishi et al. | 360/130.21 |
| 4,780,782 | 10/1988 | Bordignon | 360/132 |
| 5,074,486 | 12/1991 | Vollmann | 360/132 |

FOREIGN PATENT DOCUMENTS 0293804 12/1988 European Pat. Off. .
2224344 11/1973 Germany .
3626286 2/1988 Germany .

*Primary Examiner*—Stuart S. Levy
*Assistant Examiner*—William R. Korzuch
*Attorney, Agent, or Firm*—Brian J. Wieghaus

[57] ABSTRACT

In a cassette (1) comprising a pressure-member support (58) arranged adjacent a side wail (8) to hold an elastic pressure member (56) by means of which a magnetic tape (2) can be pressed against a magnetic head which can be introduced into the cassette (1), and comprising a tape-guide-element support (69) arranged between the side wail (8) and the pressure-member support (58) and having two tape-guide elements (67, 68) arranged mirror-symmetrically relative to the pressure member (56), the pressure-member support (58) comprises two stepped portions (79, 80) such that its central portion (57) is offset relative to its two side portions (59, 60) towards the tape-guide-element support (69) adjacent the pressure-member support (58), and the central portion (57) of the pressure-member support (58) is supported on the tape-guide-element support (69) under the influence of a pretension.

10 Claims, 2 Drawing Sheets

MAGNETIC-TAPE CASSETTE COMPRISING A PRESSURE-MEMBER SUPPORT, AND PRESSURE-MEMBER SUPPORT FOR SUCH A CASSETTE

BACKGROUND OF THE INVENTION

The invention relates to a cassette for holding a magnetic tape which is guided inside the cassette along a side wall thereof which has an access opening through which at least one magnetic head can be brought into scanning contact with the magnetic tape, which cassette comprises a pad-like elastic pressure member adapted to press the magnetic tape against the magnetic head, which pressure member is movable transversely of the side wall between a rest position and at least one contact position and is secured to a central portion of a substantially strip-shaped blade-spring-like pressure-member support which is arranged to extend substantially parallel to the side wall provided with the access opening and whose side portions, which are situated adjacent the central portion, can be made to cooperate with positioning elements of the cassette with their lateral surfaces which are remote from the side wall, and two tape-guide elements adapted to guide a magnetic tape past the magnetic head, which tape-guide elements are movable substantially transversely of the side wall and are arranged substantially mirror-symmetrically relative to the pressure member on a substantially strip-shaped blade-spring-like tape-guide-element support which is arranged to extend substantially parallel to the side wall and substantially between the pressure-member support and the side wall and has side portions which are situated adjacent its central portion and which can be made to cooperate with positioning elements of the cassette with their lateral surfaces which face the side wall.

The invention further relates to a pressure-member support for such a cassette, which support is of a strip-shaped and blade-spring-like construction and comprises a central portion for securing a pressure member and, situated adjacent the central portion, two side portions adapted to cooperate with positioning elements of the cassette.

A cassette of the type defined in the opening paragraph is known from, for example, EP 0,492,705 A1. In this known cassette the blade-spring-like pressure-member support and the side portions of the blade-spring-like pressure-member support have a flat shape, the side portions of the two supports extending parallel to the cassette side wall provided with the access opening. The two supports each comprise a right-angled tab only at the ends of the side portions, two adjacent tabs being displaced relative to one another in such a manner that these two portions can each perform a movement without touching the other portion, which movement occurs when the pressure member and the tape guide elements cooperate with a magnetic head. When the pressure member is in its rest position and the tape guide elements are in their rest positions, i.e. when these parts do not cooperate with a magnetic head, the pressure-member support and the tape-guide-element support are arranged loosely between the positioning elements provided to cooperate with these two supports. As a result of this loose arrangement of the two supports the two loose supports may produce an annoying noise when the cassette is subjected to shocks or vibrations. Moreover, as a result of this loose arrangement of the two supports both the pressure member and the two tape-guide elements may assume a comparatively large inclination relative to the magnetic tape, which is unfavourable because when the magnetic tape is positioned against a magnetic head by means of the pressure member and the tape guide elements the pressure member and the tape guide elements subject the magnetic tape to forces which tend to urge the magnetic tape out of its normal path.

Moreover, if a magnetic head enters the access opening of the prior-art cassette over a comparatively small penetration depth only and, consequently, the pressure member and the pressure-member support carrying this member are moved only over a comparatively small distance, the pressure-member support exerts only a comparatively small pressure, as a result of which the magnetic tape is not pressed satisfactorily against the magnetic head and the scanning process may be disturbed. Such a movement over a small distance may occur, for example, in a so-called search mode, in which the magnetic head is introduced into the cassette with a smaller penetration depth than during a normal recording and reproducing mode, in which the magnetic head is introduced into the cassette through the access opening over a larger penetration depth.

SUMMARY OF THE INVENTION

It is an object of the invention to preclude the above problems and to ensure that in a cassette of the type defined in the opening paragraph no annoying noises can be produced by the pressure-member support and the tape-guide-element support when the cassette is not in operation, that the tape guide elements and the pressure member cannot assume inclined positions relative to a magnetic tape, and that even in the case of a small penetration depth of a magnetic head into the cassette the pressure-member support presses the pressure member against the magnetic head with an adequate pressure.

To this end, the invention is characterized in that in each of its two transitional areas between its central portion and its two side portions the pressure-member support has a stepped portion, which two stepped portions are situated substantially mirror-symmetrically relative to the pressure member, and owing to the stepped portions the central portion is offset relative to the two side portions towards the side wall, and when the pressure member is in its rest position the central portion of the pressure-member support is supported on the tape-guide-element support under the influence of the pretension of said pressure-member support.

In this way it is achieved that when the pressure member is in its rest position and the tape guide elements are in their rest positions, i.e. if no magnetic head has been introduced into the cassette, the pretension with which the pressure-member support is mounted in the cassette and is pressed onto the tape-guide-element support constantly urges the two supports with their two side portions against the positioning elements of the cassette, which precludes a loose arrangement of the two supports in the cassette, so that these supports cannot produce any annoying noises when the cassette is subjected to shocks or vibrations.

This further ensures that both supports are always satisfactorily positioned by the positioning elements provided for this purpose, as a result of which both the pressure member and the tape guide elements occupy a position parallel to the magnetic tape, so that when the magnetic tape is applied to a magnetic head these elements cannot subject the magnetic tape to any forces which tend to urge the magnetic tape out of its normal path.

Moreover, the steps in accordance with the invention ensure that owing to the pretension of the pressure-member support even in the case of a small penetration depth of a magnetic head into the cassette, as is for example often the case in a so-called search mode, the pressure member is always pressed against a magnetic head with an adequate pressure, so that even in the case of a small penetration depth of a magnetic head the magnetic tape is reliably pressed against the magnetic head. By exerting a pretension on the pressure-member support it is also achieved that the pressure-member support can have a flat spring characteristic, the resulting pressure being comparatively independent of tolerances of the penetration depth of magnetic heads. In addition, the construction in accordance with the invention is very simple and advantageous because the support for the tape guide elements, which is present anyway, also constitutes the abutment for the pretensioned pressure-member support, so that the cassette does not require separate abutments for the pretensioned pressure-member support.

It is to be noted that from DE 36 26 286 A1 a cassette comprising a blade-spring-like pressure-member support is known, which pressure-member support is mounted in the cassette with a pretension. However, this known cassette does not comprise a tape-guide-element support which extends substantially parallel to the pressure-member support and therefore the cassette requires separate abutment provisions for the pretensioned blade-spring-like pressure-member support, the known cassette comprising abutments in the form of two separate posts projecting from a cassette main wall. Advantageously, such separate abutments for the pressure-member support are not required in a cassette in accordance with the invention because the tape-guide-element support which is present anyway is also used for this purpose.

Moreover, it is to be noted DE 22 24 344 A1 discloses a cassette in which two pressure levers which each carry a pressure member are pivotally mounted, which levers are both influenced by a pretensioned spring, the pressure levers abutting against limiting stops with their free ends in their rest positions. This cassette comprises neither a blade-spring-like pressure-member support nor a tape-guide-element support in contradistinction to the cassette in accordance with the invention. Moreover, the known cassette requires separate limiting stops for the pressure levers to take up the forces exerted by the pretensioned spring loading the two pressure levers.

In a cassette in accordance with the invention it is found to be particularly advantageous if the stepped portions are inclined relative to the two side portions of the pressure-member support. This is advantageous as it is a simple construction of the stepped portions.

It is also found to be particularly advantageous if the stepped portions of the pressure-member support have a step height of 0.5 to 1.0 mm measured perpendicularly to the central portion. In practice, such a construction appears to be particularly advantageous.

A pressure-member support in accordance with the invention is characterized in that in each of its two transitional areas between its central portion and its two side portions the pressure-member support has a stepped portion, which two stepped portions are situated substantially mirror-symmetrically relative to the central portion, and owing to the stepped portions the central portion is offset relative to the two side portions towards the lateral surface of the central portion, which surface serves to secure the pressure member. During mounting in a cassette in accordance with the invention such a pressure-member support can be pretensioned very simply in that its central portion is supported on the tape-guide-element support of the cassette. Moreover, this pressure-member support has the advantage that, it spite of the fact that it can be pretensioned particularly simply, it is of a very simple construction which in comparison with a known pressure-member support has only two additional stepped portions, which can be realized very simply in a single bending operation.

In this respect it is found to be very advantageous if the stepped portions are inclined relative to the central portion and relative to the two side portions. This is advantageous for an as simple as possible construction of the stepped portions.

Moreover, it is found to be particularly advantageous if the stepped portions of the pressure-member support have a step height of 0.5 to 1.0 mm measured perpendicularly to the central portion. In practice, such a construction is found to be particularly favourable.

BRIEF DESCRIPTION OF THE DRAWINGS

The invention will now be described in more detail with reference to the drawings which show an exemplary embodiment to which the invention is not limited.

DESCRIPTION OF THE PREFERRED EMBODIMENT

Figure 1:
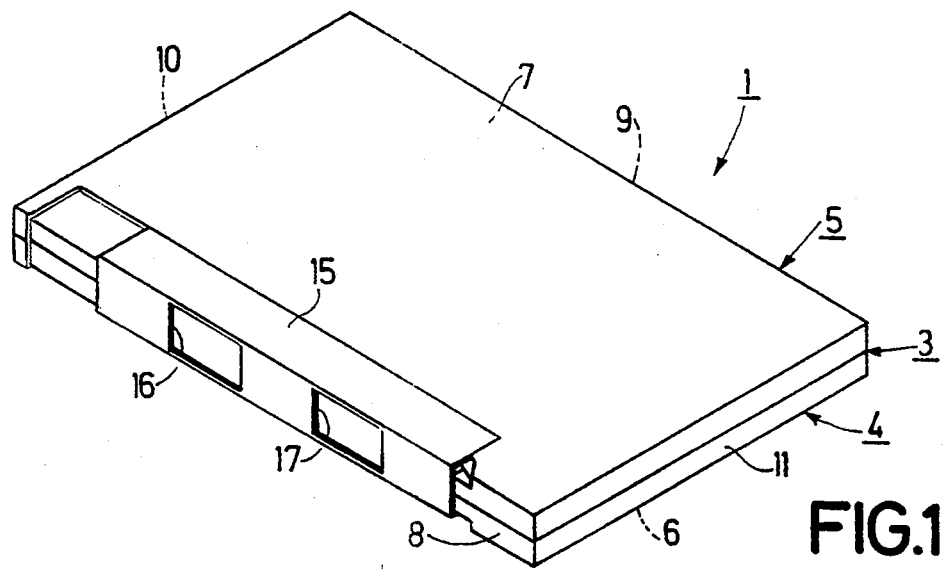
FIG. 1 is a diagrammatic oblique view of a cassette which comprises a shutter which is movable along a first side wall between a closed position and an open position to cover access openings provided in a first long side wall, the shutter being shown in its closed position.
Figure 2:
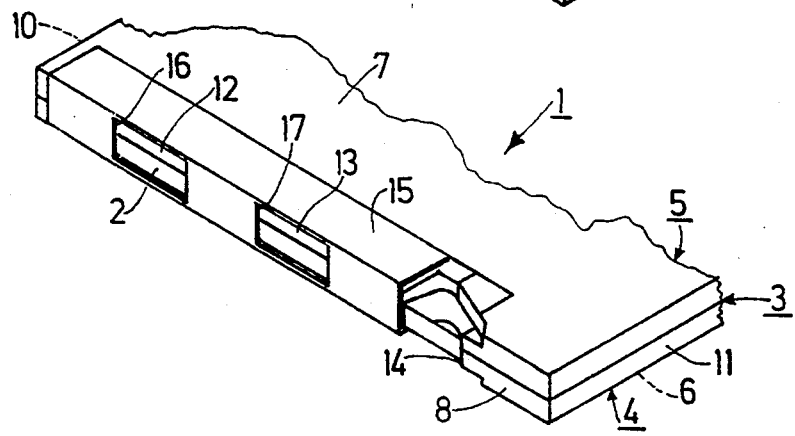
FIG. 2 shows the cassette of FIG. 1 in the same way as in FIG. 1, the cassette being partly cut-away and the shutter being shown in its open position.

FIGS. 1 and 2 show a cassette 1 for accommodating a magnetic tape 2. The cassette 1 has a rectangular housing 3 comprising a lower trough-shaped housing half 4 and an upper trough-shaped housing half 5. The housing 3 has a lower wall 6, not shown in FIGS. 1 and 2, an upper wall 7, a first long side wall 8, which faces a second long side wall 9, not shown in FIGS. 1 and 2, a first short side wall 10, not shown in FIGS. 1 and 2, and a second short side wall 11. The first long side wall 8 has three openings 12, 13 and 14. The opening 12 extends also into the lower wall 6 of the housing 3 of the cassette 1. The opening 14 also extends into the lower wall 6 and into the upper wall 7 of the housing 3 of the cassette 1. The openings 12, 13 and 14 form access openings giving access to the magnetic tape 2 in the cassette 1. In order to close the access openings 12, 13 and 14 the cassette 1 has a sheet-metal shutter 15 of substantially U-shaped cross-section, which shutter is guided on the housing 3 of the cassette 1 so as to be movable between a closed position shown in FIG. 1 and an open position shown in FIG. 2, a return spring, not shown, acting upon the shutter 15 to urge this shutter into its closed position shown in FIG. 1. The shutter 15 has two openings 16 and 17 through which the access openings 12 and 13 in the first long side wall 8 of the housing 3 of the cassette 1 are accessible when the shutter 15 is in its open position.

Figure 3:
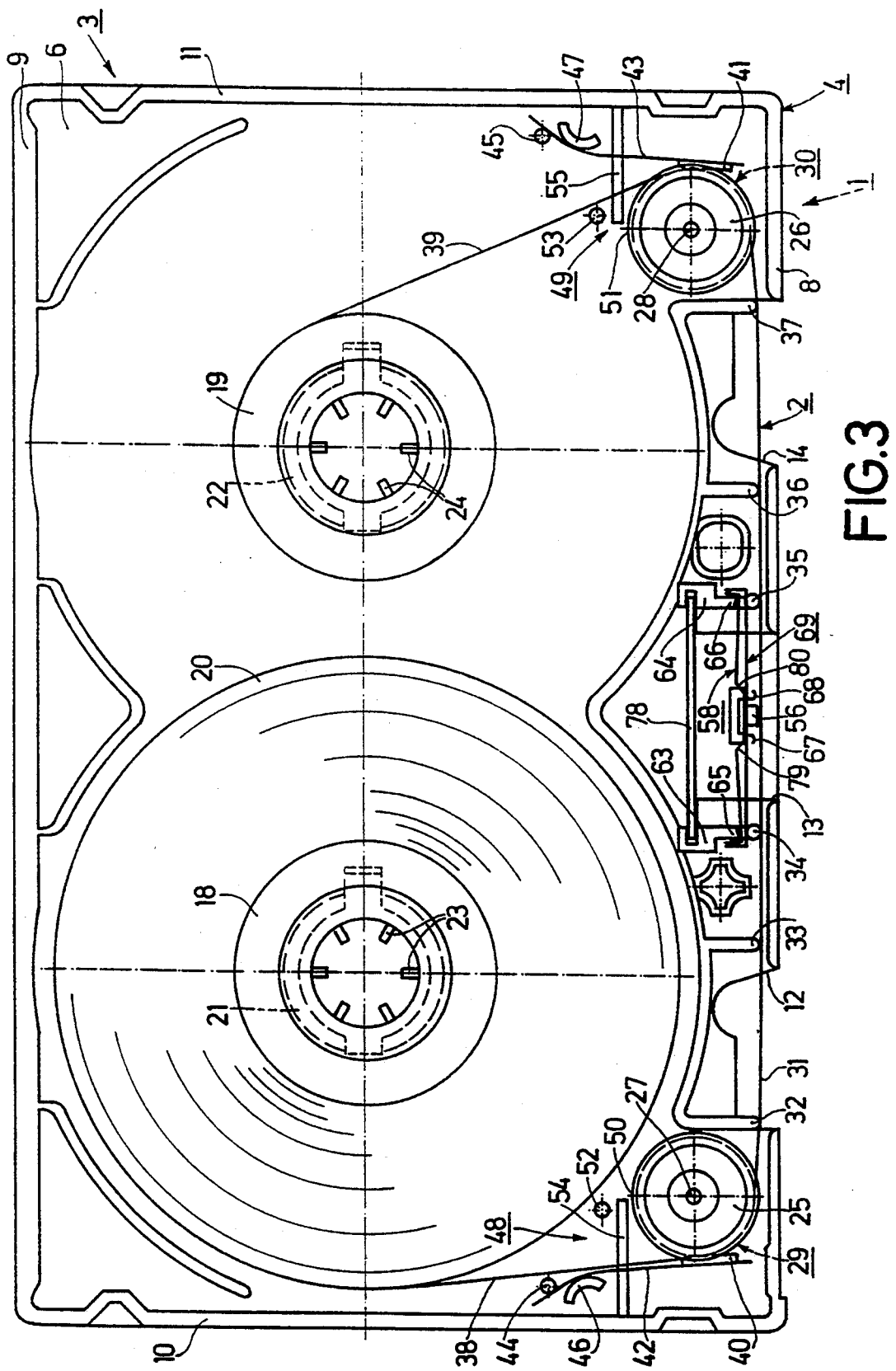
FIG. 3 is a plan view to approximately twice full-scale, showing a trough-shaped lower housing half of the cassette shown in FIGS. 1 and 2, in which housing half two reel hubs, the magnetic tape between these hubs, a pressure-member support and a tape-guide-element support are arranged adjacent one another.

As is shown in FIG. 3 the cassette 1 shown in FIGS. 1 and 2 accommodates two juxtaposed reel hubs 18 and 19 which are rotatably supported relative to the lower wall 6 and the upper wall 7, the entire magnetic tape 2 being wound onto the reel hub 18 to form a tape spool 20 in the situation illustrated in FIG. 3. At both ends the magnetic tape 2 is attached to a length of leader tape, not shown, connected to the reel hubs 18 and 19 in a manner, not shown. For rotatably supporting the two reel hubs 18 and 19 substantially ring-shaped ridges project from the lower wall 6 and the upper wall 7, the ridges provided on the lower housing half 4 bearing the reference numerals 21 and 22 in FIG. 3. Inner portions of the reel hubs 18 and 19, which are also substantially ting-shaped, carry pin-shaped inward projections 23 and 24 adapted to cooperate with reel spindles of a recording and reproducing apparatus constructed for cooperation with the cassette 1.

The cassette 1 further has two tape-guide rollers 25 and 26 arranged in the area of the ends of the first long side wall 8 and extending perpendicularly to the lower wall 6 and the upper wall 7. The tape-guide rollers 25 and 26 are each rotatably supported on a mounting pin 27 and 28, respectively, which project perpendicularly from the lower wall 6. The magnetic tape 2 is wrapped around each of the two tape-guide rollers 25 and 26 in a contact area 29 and 30, respectively. Between the two tape-guide guide rollers 25 and 26 a tape section 31 of the magnetic tape 2 extends along the first long side wall 8. In addition to the two tape-guide rollers 25 and 26 guide ribs 32 and 33, projecting perpendicularly to the lower wall 6 of the housing half 4, guide pins 34 and 35, and further guide ribs 36 and 37 have been provided to guide the tape section 31. A further tape section 38, 39 extends from each of the two tape-guide rollers 25 and 26, respectively, to one of the two reel hubs 18 and 19, respectively, each of the two further tape sections 38 and 39 extending respectively towards the tape spool on a reel hub 18 and 19.

The cassette 1 further accommodates two cleaning pads 40 and 41, each carried by a pad support, 42 and 43 respectively, mounted in the lower housing half 4 of the housing 3. The two pad supports 42 and 43 each simply comprise a blade spring, one end of each spring being inserted between a pin-shaped abutment, 44 and 45 respectively, and an arcuate abutment, 46 and 47 respectively, and the free ends of said springs carrying the cleaning pads 40 and 41, respectively, which are connected to the blade springs 42 and 43, respectively, for example by means of an adhesive. The abutments 44, 45, 46 and 47 are integral with the lower wall 6 and project perpendicularly from this wall. The cleaning pads 40 and 41 consist of, for example, a felt-like material or a flake material. The two cleaning pads 40 and 41 are pressed against the magnetic tape 2 wrapped around tape-guide rollers 25 and 26, respectively, in the respective contact area 29 or 30 of said tape-guide rollers 25 and 26.

As is shown in FIG. 3, the present cassette 1 comprises additional tape guides 52 and 53, which are oriented perpendicularly to the lower wall 6 and the upper wall 7, in areas 48 and 49 respectively which are wedge-shaped in a plan view of the upper wall 7 and the lower wall 6, which area is situated between the further tape section 38 or 39 leading away from the tape-guide roller 25 or 26, in whose contact area 29 or 30 the cleaning pad 40 or 41 is pressed against the magnetic tape 2, and the circumferential portion 50 or 51 of this tape-guide roller 25 or 26 which is not in contact with the magnetic tape 2 and which adjoins said further tape section 38 or 39. The position of the additional tape guide 52 or 53 in the wedge-shaped area 48 or 49 is suitably selected in such a manner that in normal operation of the cassette 1 the additional tape guide 52 or 53 is not in contact with the further tape section 38 or 39, as is apparent from FIG. 3. The further tape section 38 or 39 is only in contact with the additional tape guide 52 or 53 when a tape loop is formed and the additional tape guide 52 or 53 then guides the further tape section 38 or 39 perpendicularly to the lower wall 6 and the upper wall 7 in its area directly before the tape-guide roller 25 or 26. In a particularly simple manner the additional tape guides 52 and 53 each consist of a stationary cylindrical tape-guide pin.

As can be seen in FIG. 3, a tape-guide rib 54, 55 is connected to and projects from the lower wall 6 and crosses the further tape section 38 or 39 in the respective wedge-shaped area 48 or 49 between the additional tape guide 52 or 53 and the respective tape-guide roller 25 or 26. Two such tape-guide ribs are connected to the upper wall 7 in the same way so that in a plan view of the upper wall 7 and the lower wall 6 the two tape-guide ribs which are situated above one another coincide.

Figure 4:
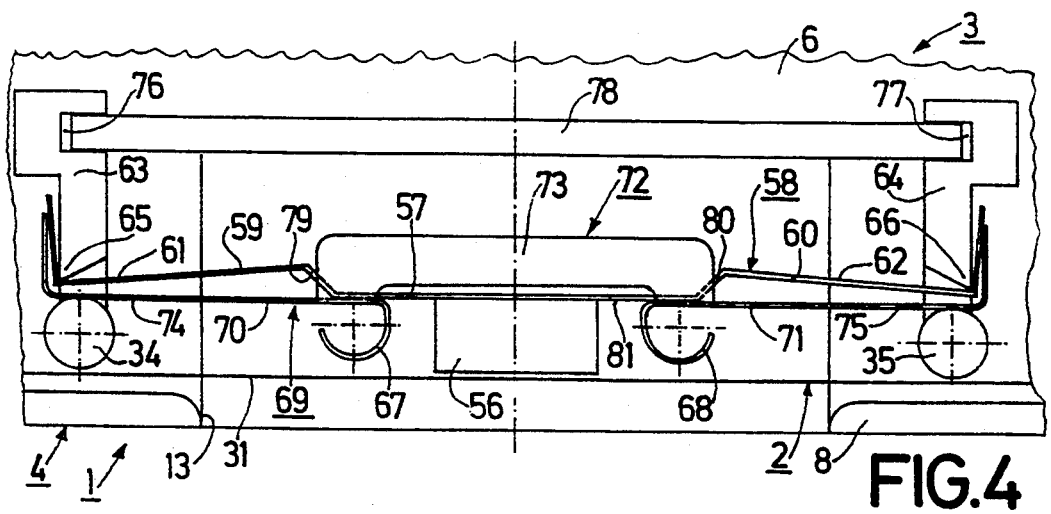
FIG. 4 shows a part of the cassette of FIGS. 1, 2 and 3 comprising the pressure-member support and the tape-guide-element support to a larger scale than FIG. 3.

As is apparent from FIGS. 3 and 4 the cassette 1 comprises a pad-like elastic pressure member 56 for pressing the magnetic tape 2 against a magnetic head, not shown, which pressure member is movable transversely of the side wall 8 with the access opening 13 between a rest position shown in FIGS. 3 and 4 and at least one contact position, not shown. The pressure member 56 is block-shaped and is made of, for example, a felt-like material or a flake material. The pressure member 56 is attached to a central portion 57 of a substantially strip-shaped blade-spring-like pressure-member support 58. The pressure-member support 58 is arranged to extend substantially parallel to the side wall 8. In addition to its central portion 57 the pressure-member support 58 has two side portions 59 and 60 adjacent the central portion 57. With their surfaces 61 and 62 which are remote from the side wall 8 the two side portions 59 and 60 can be made to cooperate with positioning elements 63 and 64 of the cassette. In the present case the positioning elements 63 and 64 of the cassette are formed by two ridges which project perpendicularly from the lower wall 6 of the housing 3 of the cassette 1 and whose ends 65 and 66 which face the side portions 59 and 60 of the pressure-member support 58 are wedge-shaped. The side portions 59 and 60 of the pressure-member support 58 can abut against said wedge-shaped ends 65 and 66 of the ridges 63 and 64.

As is also apparent from FIGS. 3 and 4 the cassette 1 accommodates two tape-guide elements 67 and 68 for guiding the magnetic tape 2 past a magnetic head, not shown, which guide elements are movable transversely of the side wall 8 and are arranged essentially mirror-symmetrically relative to the pressure member 56. In the present case the two tape-guide elements 67 and 68 are provided on a substantially strip-shaped blade-spring-like tape-guide-element support 69 and are formed by arcuate central end portions of two side portions 70 and 71 of the tape-guide-element support 69. The two side portions 70 and 71 of the tape-guide-element support 69 are interconnected by a central portion 72 formed by two central limbs which extend substantially perpendicularly relative to the two side portions 70 and 71 and of which only the central limb 73 nearest the upper wall 7 of the housing 3 of the cassette 1 is visible in FIGS. 3 and 4. The blade-spring-like tape-guide-element support 69 is arranged to extend substantially parallel to the side wall 8 and substantially between the pressure-member support 58 and the side wall 8. The two side portions 70 and 71 adjoining the central portion 72 of the tape-guide-element support 69 can be made to cooperate with positioning elements of the cassette with their surfaces 74 and 75 which face the side wall 8. In the present cassette 1 these positioning elements are formed by the aforementioned guide pins 34 and 35 for guiding the magnetic tape 2 and project perpendicularly from the lower wall 6 of the housing 3 of the cassette 1.

It is to be noted also that in their end portions which are remote from the side wall 8 the positioning ridges 63 and 64 each have a recess 76 and 77 in which a shielding element 78 of a sheet material is mounted.

Moreover, it is to be noted that a magnetic-tape cassette comprising a pressure member carded by a pressure-member support and two tape-guide elements provided on a tape-guide-element support, and the cooperation of the pressure member and the two tape-guide elements with a magnetic head are known per se from EP 0,492,705 A1 (which corresponds to U.S. Ser. No. 769,599 filed Oct. 1, 1991, herewith incorporated by reference).

Figure 5:
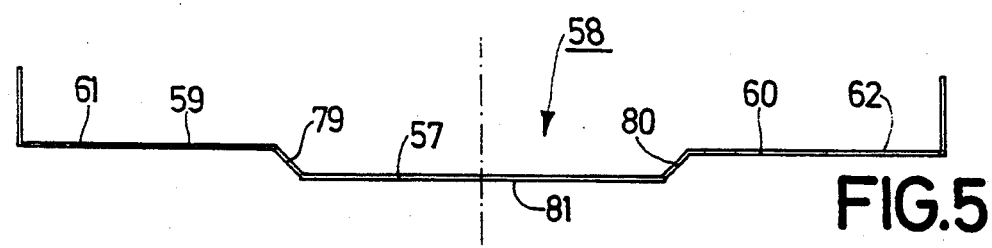
FIG. 5 shows only the pressure-member support in its original shape and in the same way as in FIG. 4.

As is apparent from FIGS. 3, 4 and 5 the pressure-member support 58 has a stepped portion, 79 and 80, in each of the transitional areas between its central portion 57 and its two side portions 59 and 60, which stepped portions 79 and 80 are situated substantially mirror-symmetrically relative to the pressure member 56 and the central portion 57 of the pressure-member support 58. Owing to the stepped portions 79 and 80 the central portion 57 is offset relative to the two side portions 59 and 60 towards the side wall 8 and towards the lateral surface 81 of the central portion 57, which surface serves for mounting the pressure member 56. When the pressure member 56 is in its rest position the central portion 57 of the pressure-member support 58, as is shown in FIGS. 3 and 4, is supported on the tape-guide-element support 69 with pretension, the areas of the central portion of the pressure-member support 58 which adjoin the stepped portions 79 and 80 bearing on the areas of the side portions 70 and 71 of the tape-guide-element support 69 which adjoin the tape guides 67 and 68. The two stepped portions 79 and 80 may be oriented substantially perpendicularly to the central portion 57 and to the side portions 59 and 60 of the pressure-member support 58. However, in the cassette shown in FIGS. 1 to 4 the stepped portions 79 and 80 of the pressure-member support 58 may be inclined relative to the central portion 57 and relative to the two side portions 59 and 60 of the pressure-member support 58, which is advantageous in order to realize the stepped portions 79 and 80 as simply as possible. In practice, it is found to be particularly advantageous if the stepped portions 79 and 80 of the pressure-member support 58 have a height of approximately 0.7 mm measured perpendicularly to the central portion 57.

Since the pressure-member support 58 is pretensioned relative to the tape-guide-element support 69 it is achieved very simply and substantially without any additional means that when the pressure member 56 is in its rest position and the tape-guide elements 67 and 68 are in their rest positions, i.e. if no magnetic head has been introduced into the cassette 1, both the pressure-member support 58 and the tape-guide-element support 69 with their two respective side portions 59, 60 and 70, 71 always engage against the respective positioning elements 63, 64 and 34, 35 provided for this purpose on the cassette, which precludes a loose arrangement of the two supports 58 and 69 in the cassette 1, so that these supports cannot produce any annoying noises when the cassette 1 is subjected to shocks or vibrations. Moreover, by pretensioning the pressure-member support 58 and supporting it on the tape-guide-element support 69 it is achieved that the two supports 58 and 69 are always positioned adequately by the positioning elements 63, 64 and 34, 35 provided for this purpose, so that both the pressure member 56 and the two tape-guide elements 67 and 68 always occupy positions parallel to the magnetic tape 2. Moreover, by pretensioning the pressure-member support 58 it is achieved that as a result of the pretension of the pressure-member support 58, even if the penetration depth of a magnetic head into the cassette 1 is small, the pressure member 56 is always pressed against a magnetic head with an adequate pressure. By pretensioning the pressure-member support 58 it is also achieved that pressure-member support 58 can have a flat spring characteristic and, consequently, the resulting pressure forces are comparatively independent of tolerances of the penetration depth of magnetic heads. A special advantage of the cassette 1 in accordance with the exemplary embodiment described above is that for supporting the pretensioned pressure-member support 58 use is made of the tape-guide-element support 69 which is anyway present in the cassette 1, so that no separate abutments are needed for taking up the forces exerted by the pretensioned pressure-member support 58.

Both the pressure-member support 58 and the tape-guide-element support 69 are made of a blade-spring metal. The choice of the material and the material thickness are such that the tape-guide-element support 69 has a substantially higher stiffness than the pressure-member support 58, so that the tape-guide-element support 69 can serve as an abutment for the pretensioned pressure-member support 58 but it is nevertheless ensured that when a magnetic head enters the cassette 1 both the pressure-member support 58 and the tape-guide-element support 69 are movable correctly and without the application of large actuating forces. It is advantageous if the tape-guide-element support 69 is made of spring steel and the pressure-member support 58 is made of spring bronze. However, the two supports 58 and 69 may also be made of synthetic materials.

The above description of the invention is based on a magnetic-tape cassette already loaded with a magnetic tape. However, the invention can also be applied to a so-called empty cassette in which only a leader tape has been attached to the two reel hubs of the cassette, the cassette not yet being loaded with a magnetic tape.

We claim:

1. A magnetic tape cassette, comprising:
   a) a length of magnetic tape;
   b) a housing holding said magnetic tape, said housing including a front wall having an opening for receiving a magnetic head, the magnetic tape extending past said opening;
   c) first and second pairs of opposing positioning elements adjacent the front wall, each pair being located at opposite lateral sides of said opening;
   d) a tape guide element support extending substantially parallel to the front wall and having opposing side portions extending between the opposing positioning elements of each of said first and second pairs of positioning elements, said tape guide element support including a pair of arcuate tape guide elements facing said front wall for guiding the magnetic tape past the opening, the tape guide elements being moveable substantially transversely of the front wall and arranged substantially mirror symmetrically to the opening in the front wall; and
   e) an elastic pressure member support having opposing side portions each extending between the opposing positioning elements of a respective one of said first and second pairs of positioning elements, the tape guide element support being situated between the pressure member support and the front wall, the pressure member support including a central portion for engaging the magnetic tape and pressing the magnetic tape against a magnetic head received in the front wall opening, the central portion extending substantially parallel to the front wall opposite the opening, and two stepped portions each situated between the central portion and a respective one of the side portions of the pressure member support, the two stepped portions offsetting said central portion from said side portions towards the front wall, the pressure member support having a rest position, in which the central portion is not engaged by a magnetic head received in the front wall opening, in the rest position the central portion having two opposing portions, each adjacent the respective said stepped portion, which are being biased with pretension against said tape guide element support at the location of said arcuate tape guide elements due to said stepped portions and said side portions of the pressure member support being biased against their respective positioning elements.

2. A cassette according to claim 1, wherein said central portion of said pressure member support includes a pad-like elastic pressure member.

3. A cassette according to claim 2, wherein said two stepped portions are inclined relative to said two side portions of the pressure member support.

4. A cassette according to claim 1, wherein each pair of positioning members includes a positioning member more remote from said front wall than the other positioning member, and in the rest position of the pressure member the side portions of the pressure member have a major face facing away from the front wall which engage the more remote positioning members and the side portions of the tape guide element support have major faces facing the front wall which engage the other positioning members.

5. A cassette (1) as claimed in claim 1, characterized in that the stepped portions are inclined relative to the two side portions of the pressure-member support.

6. A cassette (1) as claimed in claim 2, characterized in that the stepped portions of the pressure-member support have a step height of 0.5 to 1.0 mm measured perpendicularly to the central portion.

7. A pressure-member support as claimed in claim 4, characterized in that the stepped portions of the pressure-member member support have a step height of 0.5 to 1.0 mm measured perpendicularly to the central portion.

8. A pressure member support for a tape cassette having
   a) a length of magnetic tape;
   b) a housing holding said magnetic tape, said housing including a front wall having an opening for receiving a magnetic head, the magnetic tape extending past said opening;
   c) first and second pairs of opposing positioning elements adjacent the front wall, each pair being located at opposite lateral sides of said opening; and
   d) a tape guide element support extending substantially parallel to the front wall and having opposing side portions extending between the opposing positioning elements of each of said first and second pairs of positioning elements, said tape guide support including a pair of arcuate tape guide elements facing said front wall for guiding the magnetic tape past the opening, the tape guide elements being moveable substantially transversely of the front wall and arranged substantially mirror symmetrically to the opening in the front wall,
   wherein said pressure member support comprises:
      a length of elastic planar material having
         (i) opposing major faces and presenting a length dimension;
         (ii) opposing side portions spaced along the length dimension of the pressure member each for extending between the opposing positioning elements of a respective one of the first and second pairs of positioning elements of the cassette,
         (iii) a central portion between the side portions, and a pad-like elastic pressure member secured to a major face of the central portion; and
         (iv) two stepped portions each situated between the central portion and a respective one of the side portions of the pressure member support, the two stepped portions offsetting said central portion from said side portions in a direction normal to and away from the major face of the central portion to which said pressure member is secured,
      the pressure member support being dimensioned such that, when assembled in the cassette with its side portions arranged between the positioning elements of the cassette and with the tape guide element located between the pressure member support and the cassette front wall, the pressure member support has a rest position, in which the central portion is not engaged by a magnetic head received in the front wall opening, in which the central portion has two opposing portions, each adjacent the respective said stepped portion, which are biased with pretension against said tape guide element support at the location of said arcuate tape guide elements and said side portions are biased against their respective positioning elements.

9. A pressure-member support as claimed in claim 8, characterized in that the stepped portions are inclined relative to the central portion and relative to the two side portions.

10. A pressure-member support as claimed in claim 5, characterized in that the stepped portions of the pressure-member support have a step height of 0.5 to 1.0 mm measured perpendicularly to the central portion.

* * * * *